3,014,965
2,3,5,6-TETRACHLOROBENZOIC ACID AMIDES
Jack S. Newcomer, Wilson, Keith J. Smith, Lockport, and Jerome Linder, Niagara Falls, N.Y., assignors to Hooker Chemical Corporation, a corporation of New York
No Drawing. Filed Apr. 29, 1955, Ser. No. 505,032
1 Claim. (Cl. 260—558)

The present invention relates to weed control, and to methods and compositions for preventing germination, inhibiting normal growth, and killing undesirable vegetation. More particularly, the invention pertains to methods of manufacture and utilization of new compositions which are highly effective as herbicides. The invention also pertains to the new organic compounds 2,3,5,6-tetrachlorbenzoic acid halides and derivatives thereof which materials are useful as active ingredients of compositions prepared for use as herbicides.

It is an object of this invention to provide concentrated or diluted herbicidal compositions which contain, as an active ingredient thereof, the compound 2,3,5,6-tetrachlorobenzoic acid and derivatives thereof; preferably compounds selected from the group consisting of 2,3,5,6-tetrachlorobenzoic acid, acid halides, esters, salts, amides and mixtures thereof; and more preferably, compounds of 2,3,5,6-tetrachlorobenzoic acid which when in the presence of water yield anions of said acid. Another object of the invention is to provide novel methods for the manufacture of highly active concentrated or diluted herbicidal compositions containing 2,3,5,6-tetrachlorobenzoic acid and its derivatives. Still another object of the invention is to provide the new organic compound 2,3,5,6-tetrachlorobenzoic acid and derivatives thereof. Various other objects will become apparent on consideration of this specification.

For the purpose of easier understanding and to avoid an unduly prolix disclosure, the preferred embodiments will be explained and illustrated in some detail; however, this is not to be construed as limiting the invention to these preferred embodiments alone, as it is intended to embrace their equivalents. In addition, in the following specification reference will be made to just the "acids"; however, those skilled in the art will appreciate those instances where the acid chloride, salts or other derivatives may be substituted for the acid in the instance described. Also, reference will be made to "polychlorobenzoate" or other "polychloro" derivative and by "polychloro" is meant a material having a herbicidal amount and, as an active ingredient, the 2,3,5,6-tetrachlorobenzoate isomer of this invention.

We have now found that 2,3,5,6-tetrachlorobenzoic acid halides can be prepared by chlorinating benzoyl halides and this followed by hydrolysis of the chlorinated benzoyl halides produces the corresponding chlorinated benzoic acids or its derivatives as hereinafter set forth and that these materials possess valuable herbicidal properties. Since benzoyl chloride is the preferred benzoyl halide because of economical considerations, it will be described in some detail. However, it is to be understood that, in place of the benzoyl chloride, other starting materials such as benzoic acid, benzoic anhydride, and other benzoic derivatives may be employed. When using benzoyl chloride, it has further been found that the amount of 2,3,5,6-tetrachlorobenzoic acid chloride which is produced is dependent upon the specific gravity of the chlorinated benzoyl chloride which is produced in the chlorination. In accordance with our invention optimum yields of 2,3,5,6-tetrachlorobenzoyl chloride are obtained by chlorinating benzoyl chloride to a product having a specific gravity at 25 degrees centigrade within the range of 1.63 to 1.72. However, significant amounts of 2,3,5,6-tetrachlorobenzoyl chloride are produced in our process by chlorination to a specific gravity of as low as 1.55. Thus, the desired specific gravities of the chlorination products at 25 degrees centigrade is varied in accordance with our invention from 1.55 to 1.72, depending upon the amount of 2,3,5,6-tetrachlorobenzoyl chloride desired. Chlorinating to a product having a specific gravity lower than 1.55 is less desirable, because of low conversions. We have also found that as the specific gravity of the product resulting from the chlorination exceeds a value of 1.72, the amount of 2,3,5,6-tetrachlorobenzoyl chloride produced decreases rapidly.

The chlorination of benzoyl halides to 2,3,5,6-tetrachlorobenzoyl halides is performed by introducing chlorine into the benzoyl halide, containing a catalytic quantity of chlorination catalyst, at a temperature between 100–230 degrees centigrade. Irrespective of the benzoyl halide which is employed, temperatures below 100 degrees centigrade result in a very slow rate of reaction. In the particular case in which benzoyl chloride is chlorinated to produce a maximum amount of 2,3,5,6-tetrachlorobenzoyl chloride, a minimum initial chlorination temperature of 110 degrees centigrade is desirable, and a final chlorination temperature within the range of 150 to 220 degrees centigrade, preferably 150 to 195 degrees centigrade, should be maintained. The chlorination of benzoyl fluoride to 2,3,5,6-tetrachlorobenzoyl fluoride has been accomplished at a temperature range of about 105 to 215 degrees centigrade until the chlorination reaches the desired extent.

Hydrolysis of the chlorinated benzoyl halides to produce the 2,3,5,6-tetrachlorobenzoic acid of this invention has been accomplished in a variety of ways: boiling with water, treatment with aqueous caustic followed by acidification with a mineral acid, warming with acetic acid followed by water dilution, treatment of an acetone solution with water, or treatment of an acetone solution with aqueous caustic followed by acidification with a mineral acid. For economical reasons, the preferred conversion of the chlorinated benzoyl halides to the acids involves treatment with water at the boiling point and with efficient agitation.

Several methods are suitable for the production of salts of the chlorinated benzoic acids. The chlorinated benzoyl chlorides can be treated with aqueous bases such as triethylamine, sodium hydroxide, potassium hydroxide, calcium hydroxide, etc., to produce the corresponding salts of the chlorinated benzoic acids in a direct procedure from the chlorinated benzoyl chlorides.

On the other hand, chlorinated benzoic acid can be treated by reaction with aqueous ammonia, amines, alkali metal oxides, hydroxides, or carbonates, alkaline earth metal oxides, hydroxides or carbonates, etc., to produce the corresponding salts of the chlorinated benzoic acids.

Desirable compositions of the chlorinated benzoic acids, or salts, are obtained by employing the crude chlorinated benzoyl chlorides in the subsequent treatment or treatments. For certain specific uses, it is sometimes desirable to effect separations within the crude chlorinated benzoyl chloride, or within the corresponding acid, or within the corresponding salts or other derivatives, or a combination of these methods. For example, crude chlorinated benzoyl chlorides when prepared in accordance with the invention, can be distilled at reduced pressures to separate substantially pure 2,3,5,6-tetrachlorobenzoyl chloride. This product may then be separately hydrolyzed to the corresponding acids or salts, or converted to other derivatives. Another method of separating the tetrachlorobenzoyl chloride has been found by fractional crystallization procedures either in the form of the acid chloride or in the form of the acid.

Considerable evaluation studies have been performed to demonstrate the unusually high herbicidal activity of 2,3,5,6-tetrachlorobenzoic acid and its derivatives which, when in the presence of water, yield anions of 2,3,5,6-tetrachlorobenzoic acid. Field test plots have been performed on the acid, the sodium salt, various ammonium salts of the 2,3,5,6-tetrachloro isomer, and such derivatives as follows: N-n-butyl polychlorobenzamide, N,N-n-dibutyl polychlorobenzamide, N-isopropyl polychlorobenzamide, N,N-diisopropyl polychlorobenzamide, N-benzyl polychlorobenzamide, N-(2-hydroxyethyl) polychlorobenzamide, N,N-bis (2-hydroxyethyl) polychlorobenzamide, N-methyl polychlorobenzamide, N,N-dimethyl polychlorobenzamide, N-cyclohexyl polychlorobenzamide, polychlorobenzamide, and such derivatives obtained from polychlorobenzamide as methyl polychlorophenyl carbamate, 2-chloroethyl N-polychlorophenyl carbamate, N-polychlorophenyl-N'-n-butyl urea, N-polychlorophenyl-N'-(2-hydroxyethyl) urea, N-polychlorophenyl-N'-dimethyl urea, N-polychlorophenyl-N'-cyclohexyl urea, N-polychlorophenyl-N'-diisopropyl urea, N-polychlorophenyl-N'-benzyl urea, N-polychlorophenyl-N'-isopropyl urea, and N-polychlorophenyl-N'-dibutyl urea.

For the purposes of the present invention, we are particularly concerned with 2,3,5,6-tetrachlorobenzoic acid and its salts since these materials are highly ionizable and readily yield the anion in the presence of water. We do not imply any limitation as to the particular salt involved, since the inherent high herbicidal activity appears to be due to the polychlorobenzoic anion, illustrated for the purpose of easier understanding by means of the 2,3,5,6-tetrachlorobenzoic anion, as follows:

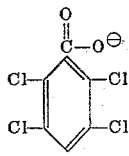

Ionization of the free acid and salts thus lead to the polychlorobenzoic anion, and high herbicidal activity. Of course, we do not wish to be bound to any specified mechanism account for herbicidal activity.

Changes at the carboxyl group are mere changes in form rather than changes in substance. Thus, the acid, acid anhydride, acid halides or salts may be employed as herbicides.

Examples of acid halides are 2,3,5,6-tetrachlorobenzoyl chloride, 2,3,5,6-tetrachlorobenzoyl bromide and 2,3,5,6-tetrachlorobenzoyl fluoride.

Suitable salts include those which contain an inorganic or organic cation such as sodium, potassium, calcium, strontium, barium, magnesium, aluminum, iron, cobalt, nickel, zinc, cadmium, mercury, copper, ammonium, mono-, di- and tri-alkylammonium, mono-, di- and tri-alkanolammonium, and mixed alkylalkanolammonium which is N-substituted by from 2 to 3 radicals of the type indicated, in chemical combination with such number of 2,3,5,6-tetrachlorobenzoate anion or anions as is demanded to satisfy valence requirements.

The alkylammonium salts such as monoalkylammonium, dialkylammonium, or trialkylammonium preferably have from 1 to 18 carbon atoms in each alkyl group, the totality of carbon atoms preferably being not more than 18. The alkanolammonium salts such as monoalkanolammonium, dialkanolammonium, or trialkanolammonium preferably have from 2 to 3 carbon atoms in each alkanol group. The mixed alkylalkanolammonium salts such as monoalkyl monoalkanolammonium, dialkyl monoalkanolammonium, or monoalkyl dialkanolammonium preferably have from 1 to 4 carbon atoms in each alkyl group and from 2 to 3 carbon atoms in each alkanol group.

Examples of monoalkylammonium salts are the monomethylammonium, monoethylammonium, monopropylammonium, monobutylammonium, monoamylammonium, monohexylammonium, monoheptylammonium, monooctylammonium, mononylammonium, monodecylammonium, monoundecylammonium, monododecylammonium, and similar monoalkylammonium salts of 2,3,5,6-tetrachlorobenzoic acid.

Examples of dialkylammonium salts are the dimethylammonium, diethylammonium, dipropylammonium, dibutylammonium, diamylammonium, dihexylammonium, methylethylammonium, ethylpropylammonium, propylbutylammonium, butylamylammonium, amylhexylammonium, methylundecylammonium, and similar dialkylammonium salts of 2,3,5,6-tetrachlorobenzoic acid.

Examples of trialkylammonium salts are the trimethylammonium, triethylammonium, tripropylammonium, tributylammonium, methyldiethylammonium, ethyldipropylammonium, propyldibutylammonium, methyldiamylammonium, ethyldiamylammonium, methylethylpropylammonium, ethylpropylbutylammonium, and similar salts of 2,3,5,6-tetrachlorobenzoic acid.

Examples of monoalkanolammonium salts are the monoethanolammonium, monopropanolammonium, and similar salts of 2,3,5,6-tetrachlorobenzoic acid.

Examples of dialkanolammonium salts are the diethanolammonium, dipropanolammonium, ethanolpropanolammonium and similar salts of 2,3,5,6-tetrachlorobenzoic acid.

Examples of trialkanolammonium salts are the triethanolammonium, tripropanolammonium, ethanoldipropanolammonium, propanoldiethanolammonium, and similar salts of 2,3,5,6-tetrachlorobenzoic acid.

Examples of monoalkyl monoalkanolammonium salts are the methylethanolammonium, ethylethanolammonium, propylethanolammonium, butylethanolammonium, methylpropanolammonium, ethylpropanolammonium, propylpropanolammonium, butylpropanolammonium, and similar salts of 2,3,5,6-tetrachlorobenzoic acid.

Examples of dialkyl monoalkanolammonium salts are the dimethylethanolammonium, diethylethanolammonium, dipropylethanolammonium, dibutylethanolammonium, dimethylpropanolammonium, diethylpropanolammonium, dipropylpropanolammonium, dibutylpropanolammonium, methylethylethanolammonium, methylethylpropanolammonium, ethylpropylethanolammonium, ethylpropylpropanolammonium, propylbutylethanolammonium, propylbutylpropanolammonium, and similar salts of 2,3,5,6-tetrachlorobenzoic acid.

Examples of monoalkyl dialkanolammonium salts are the methyldiethanolammonium, ethyldiethanolammonium, propyldiethanolammonium, butyldiethanolammonium, methyldipropanolammonium, ethyldipropanolammonium, propyldipropanolammonium, butyldipropanolammonium, methylethanolpropanolammonium, ethylethanolpropanolammonium, propylethanolpropanolammonium, butylethanolpropanolammonium, and similar salts of 2,3,5,6-tetrachlorobenzoic acid.

Various types of formulations of agricultural chemicals are well known in the art, and we do not imply any limitation as to the diluents employed in the formulation of our polychlorobenzoic acids, or salts thereof. The polychlorobenzoic acids may be formulated in an oil solvent alone, in an oil solvent containing a wetting agent, by pelletizing the polychlorobenzoic acid in or on an inert argillaceous material, by micronizing a mixture of the acid and a wetting agent, or the like. The polychlorobenzoate may be prepared as a liquid formulation by dissolving it with a suitable oil or hydrocarbon solvent, such as xylene, toluene, gasoline, kerosene, as well as alkyl naphthalenes, methyl naphthalenes, dimethyl naphthalene, trimethyl naphthalene, ethyl naphthalene, etc., or other hydrocarbons having similar density, or with alcohols, ethers, ketones, and esters containing up to about 10 carbon atoms which are commonly used as industrial solvents, such as ethyl alcohols, methyl alcohol, isopropyl alcohol, butyl alcohol, ethyl ether, acetone, etc. The concentration of solvent added depends upon its solubilizing properties for the polychlorobenzoate and the desired density of the formulated product. A surface active or wetting agent is generally added to the solvent and the polychlorobenzoate to produce an emulsifiable system. Suitable wetting agents are sodium alkylaryl sulfonates, sulfonated dicarboxylic acid esters such as dioctyl sodium sulfosuccinate, alkyl naphthalene sulfonic acids, etc. Such an emulsifiable system may be mixed with water to form an aqueous dispersion of polychlorobenzoate which is applied to weeds as a spray by use of highly specialized low-gallonage sprayers or conventional sprayers. The concentration of the wetting agent depends upon the amount necessary to obtain an emulsion. The polychlorobenzoates may be prepared as a solid or dust formulation. Such a formulation may be prepared by spraying the polychlorobenzoate onto a highly absorptive solid diluent, such as highly absorptive silica. The coated diluent is then further diluted by blending with a solid diluent, such as clay, talc, silica, bentonite, diatomaceous earth, chalk, wood flour, etc., to produce a finished dust. The solid formulations may be made wettable by the addition of a suitable wetting agent such as described above with respect to liquid formulations. A solid formulation also may be prepared by grinding polychlorobenzoate in a hammer mill with any of the above solid diluents. The manner of formulation is dependent to some extent upon the type of vegetation on which the material is applied, and also on economic considerations, both of which are factors well-known in the art and may be reviewed in conjunction with formulations disclosed for 2,4-dichlorophenoxy acetic acid and salts, 2,4,5-trichlorophenoxy acetic acid and salts, endoxohexahydrophthalic acid and salts, substituted phenol herbicides and their salts, isopropyl N-3-chlorophenyl carbamate, etc. When an oil solvent is used to formulate our polychlorobenzoic acids, we sometimes incorporate an oxygenated solvent to increase the solubility of the polychlorobenzoic acid. For example, a few percent of an oxygenated solvent, or a mixture of oxygenated solvents are employed such as isopropanol, isophorone, amyl alcohols, methyl isobutyl ketone, methyl isobutyl carbinol, methyl ethyl ketone, and the like. The various formulations may be applied as such or admixed with water or other carriers. For example, oil formulations may be diluted with other oils. Oil formulations containing emulsifying agents may be disposed in water. Micronized wettable powders may be mixed with water. Pelletized formulations may be applied as such, or further diluted with inert solid carriers. The salts of our polychlorobenzoic acids may be formulated as the solid salt, as the solid salt containing a wettable agent, as a pelletized form in which the salt is incorporated into an inert argillaceous material, as water solutions, as water solutions containing wetting agents, as oil solutions which may contain oxygenated additives for increasing the solubility, and the like. The various formulations of the salts of our polychlorobenzoic acids may be applied as such, or admixed with water or other carriers.

Our polychlorobenzoic acids, and salts thereof, are compatible with most other agricultural chemicals, whether they be fertilizers, other herbicides, insecticides, fungicides, or the like. For example, the known herbicide isopropyl N-(3-chlorophenyl) carbamate is advantageously admixed with our polychlorobenzoic acids to obtain the desirable complementary herbicidal effects of both chemicals. Other herbicides which may be advantageously admixed with our polychlorobenzoic acids, or salts thereof, include 2,4-dichlorophenoxy acetic acid, salts, and esters, 2,4,5-trichlorophenoxy acetic acid, salts and esters, aminotriazole and its salts, alkyl dinitro phenols and their salts, trichloroacetic acid, its salts and esters, dichloropropionic acid, its salts and esters, maleic hydrazide and its salts, sodium chlorate with and without various borates, phenyl dialkyl ureas and their chlorinated derivatives, and the like. Synergistic effects in the control of vegetation have been observed when our polychlorobenzoic acid, and salts thereof, are admixed with other herbicides. It is understood, therefore, that our novel herbicides may be formulated and applied in conjunction with other agricultural chemicals.

In one embodiment of this invention, there is applied to soil and/or vegetation, compositions containing a compound which yields anions of 2,3,5,6-tetrachlorobenzoic acid as an active herbicidal ingredient when in the presence of water. These compositions are effective herbicides whether used either in pre-emergent or post-emergent applications with respect to vegetation. Because of the unusually long persistence of these compositions in the soil, very effective weed control is obtained by application of the compositions to the soil prior to emergence of unwanted vegetation. Because the compositions are hormonal, very effective weed control is also obtained by application to vegetation which has emerged. The compositions are unusually effective in preventing germination, inhibiting normal growth, and killing undesirable vegetation such as annual narrow leaf and broad leaf weeds, perennial weeds, brush, and for general soil sterilization purposes. Many agronomic crops are resistant to these compositions when applied at rates which very effectively prevent growth of undesired vegetation commonly associated with these crops.

The following examples are given by way of illustration, and are not to be construed as limiting the scope of this invention.

EXAMPLE 1

*Chlorination of benzoyl chloride.*—Chlorine was passed into benzoyl chloride, containing 0.1 percent of its weight of ferric chloride, at a temperature of 110 to 115 degrees centigrade until the specific gravity at 25 degrees centigrade of an air-blown sample was 1.55. As this specific gravity is approached, the chlorine efficiency becomes quite poor, and for this reason, it has been expedient in some preparations to perform this phase of the chlorination at a temperature range of 110 to 140 degrees centigrade. This phase of the chlorination has also been performed at a temperature range of 160 to 170 degrees centigrade, which results in a slight increase in undistillable residue and a modified distribution of isomers. The second phase of the chlorination is performed at a temperature range of upwards of 115 to 195 degrees centigrade. For example, chlorine was passed into the polychlorobenzoyl chloride mixture resulting from the first stage of the chlorination, at a temperature range of 150 to 170 degrees centigrade, until the specific gravity at 25 degrees centigrade of an air-blown sample was 1.66. The chlorination was continued at a temperature range of 175 to 195 degrees centigrade until the specific gravity (25 degrees centigrade) was 1.705. The chlorination was continued at a temperature range of 190 to 195 degrees centigrade until the increase in weight of the product, and analysis, corresponded to an introduction of 4.7 chlorine atoms into the ring.

Typical analytical results for the various polychlorinated benzoyl chlorides are as follows:

| Specific Gravity, 25° C. | Approximate percent by Wt. of 2,3,5,6-tetrachlorobenzoyl chloride |
|---|---|
| 1.600 | 10 |
| 1.602 | 13 |
| 1.631 | 35 |
| 1.658 | 40 |
| 1.68 | 55 |
| 1.705 | 45 |

A maximum percentage of 2,3,5,6-tetrachlorobenzoyl chloride has been found at a specific gravity between 1.658 and 1.705.

The fractionations of each of the various polychlorobenzoyl chlorides above were performed on a column equivalent to about 100 theoretical plates to give pure 2,3,5,6-tetrachlorobenzoyl chloride (B.P. 142 degrees centigrade at 2 mm. Hg. 1 gram consumed 70.5 ml. of 0.1 NaOH and 35.9 ml. of 0.1 N AgNO$_3$).

EXAMPLE 2

*Chlorination of benzoyl fluoride.*—Benzoyl fluoride, prepared by reacting benzoyl chloride with potassium bifluoride, was chlorinated in the presence of ferric chloride (0.3 percent by weight of benzoyl fluoride) at an initial temperature of 106 degrees centigrade and a final temperature of 214 degrees centigrade until the gain in weight corresponded to the introduction of not quite four chlorine atoms per molecule. The chlorinated benzoyl fluoride was hydrolyzed to the corresponding acid by boiling with water for 6 hours. The mixture was cooled and the solid acid was filtered, washed with water, dried and found to contain 53 percent chlorine, corresponding essentially to the tetrachlorobenzoic acid.

EXAMPLE 3

*Hydrolysis of polychlorobenzoyl chlorides to polychlorobenzoic acids.*—Each of the polychlorobenzoyl chlorides enumerated in Example 1 was hydrolyzed to the corresponding acid by boiling with water. For illustration purposes, the hydrolyses of polychlorobenzoyl chlorides having specific gravities of 1.631 and 1.705 are detailed.

Crude, undistilled polychlorobenzoyl chloride having a specific gravity at 25 degrees centigrade of 1.631 was charged into a vessel along with 15 times its weight of water. The water-insoluble polychlorobenzoyl chloride was well dispersed in the mixture by efficient agitation. The mixture was refluxed (103 degrees centigrade) until the chloride content of the aqueous phase reached a constant value. Complete hydrolysis was thus achieved after 9 hours of reflux. At this stage, the mixture consisted of a lower layer of liquid polychlorobenzoic acids and an upper layer of hydrochloric acid. Various means have been employed to separate the polychlorobenzoic acids from the aqueous phase. For example, the entire mixture has been extracted with water-immiscible solvents such as xylene, followed by evaporation of the xylene solution to give a molten polychlorobenzoic acid which was then flaked. As an alternative procedure, the xylene solution is water washed, and emulsifying agents have been added to give a final product formulated for herbicidal application. As another alternative, the lower liquid layer of polychlorobenzoic acids have been separated from the upper aqueous layer, with and without water washing procedures, and then cast or flaked. As another alternative procedure, the reaction mixture has been cooled to room temperature with agitation whereby the polychlorobenzoic acids form a solid, granular suspension in the aqueous phase. In this case, the cooled suspension was filtered and the solid product was washed with water and dried. The product was obtained in 98 percent yield and analyzed 49.6 percent chlorine, 0.0 percent active chlorine, and 1 gram consumed 41.3 ml. of 0.1 N caustic for neutralization.

Hydrolysis of polychlorobenzoyl chlorides of specific gravity 1.705 (25 degrees centigrade) was performed in a similar matter, except here it is sometimes preferable to use a greater amount of water to increase the rate of hydrolysis. The product analyzed 56.85 percent chlorine, 0.0 percent active chlorine, and 1 gram consumed 36.62 ml. of 0.1 N caustic for neutralization.

Similar results were obtained when each of the other specified polychlorobenzoyl chlorides were hydrolyzed. Rate studies showed that the time for complete hydrolysis increases with the chlorine content of the polychlorobenzoyl chlorides which are used, and decreases with the use of greater ratios of water to polychlorobenzoyl chlorides. The time required for the various hydrolyses varied from 5 to 15 hours. Various means were employed to increase the rate of hydrolysis. For example, one part by weight of the acid chloride was heated with one part by weight of acetic acid at 100 degrees centigrade. Upon completion of evolution of hydrogen chloride (2 hours), the solution was poured into cold water and the solidified acid was filtered and dried. The use of aqueous mixtures containing a solubilizing ingredient such as acetone and acetic acid caused marked increases in the rate of hydrolysis. Aqueous caustic also increased the rate of hydrolysis and especially the use of aqueous caustic on an acetone solution of the polychlorobenzoyl chloride. For example, the entire range of polychlorobenzoyl chlorides enumerated in Example 1 were completely hydrolyzed to sodium polychlorobenzoates within 20 minutes at room temperature by adding a slight molar excess of aqueous caustic to a 5 percent solution of the polychlorobenzoyl chloride in acetone.

EXAMPLE 4

*Hydrolysis of 2,3,5,6-tetrachlorobenzoyl chloride to 2,3,5,6-tetrachlorobenzoic acid.*—2,3,5,6-tetrachlorobenzoyl chloride was agitated for 15 hours with 15 times its weight of water at 100 degrees centigrade. The mixture was then cooled to 10 degrees centigrade, filtered, the insoluble acid washed with water and dried. It melted at 179 to 181 degrees centigrade. Recrystallization from a mixture of benzene and hexane increased the melting point to 182.2 to 182.7 degrees centigrade. Further recrystallizations, alternating the use of benzene-hexane and acetic acid-water, resulted in no further increase in the melting point. The product was found to have a neutral equivalent of 259 (calculated 260). It was identified as a new composition of matter as shown in Example 5.

EXAMPLE 5

*Identification of 2,3,5,6-tetrachlorobenzoic acid.*—The acid, 5 grams, as prepared in Example 4, was heated at a temperature of 280 degrees centigrade with aqueous glycerol containing sufficient caustic to render the mixture neutral to litmus paper. The solid which distilled out of the mixture weighed 3.8 grams (90 percent yield) and had a melting point of 136.6 to 138 degrees centigrade. The material was shown to be 1,2,4,5-tetrachlorobenzene by obtaining no depression upon determining the melting point of a mixture of the product with an authentic specimen of 1,2,4,5-tetrachlorobenzene. In a similar experiment, the entire distillate was separated from water by benzene extraction and the benzene was removed by evaporation. The entire crude product was shown by infra-red analysis to be at least 90 percent of 1,2,4,5-tetrachlorobenzene with no evidence for the presence of any other chlorinated benzene. These data establish the identity of the acid as 2,3,5,6-tetrachlorobenzoic acid.

EXAMPLE 6

*Formation of salts of polychlorobenzoic acids.*—The various polychlorobenzoyl chlorides enumerated in Example 1, as well as the corresponding polychlorobenzoic acids have been converted to a variety of salts. For illustrative purposes, details are given for the formation of the sodium salt of polychlorobenzoic acids derived from polychlorobenzoyl chlorides of specific gravity (25 degrees centigrade) 1.631. Approximately 25 percent aqueous caustic solution was added to an agitated mixture of 100 grams polychlorobenzoic acid and 100 grams water at 90 degrees centigrade. Upon attaining a pH of 9, addition of caustic solution was stopped and sufficient water was added to make a 33 percent solution of sodium polychlorobenzoate. The solution was filtered at 90 degrees centigrade to remove insoluble material, amounting to 2.0 grams. The filtrate was evaporated on a steam bath using a slow current of air, and the solid product was dried to constant weight at 105 degrees centigrade. It analyzed 44.2 percent chlorine. In a similar fashion, potassium and calcium salts are readily prepared. Certain organic amine salts such as the diethylammonium, diisopropylammonium, and bis-(2-hydroxyethyl) ammonium salts are sufficiently insoluble in water such that they were prepared by agitating the polychlorobenzoic acids with the aqueous amines and filtering the salts. Such salts were also readily prepared by adding the appropriate amine to xylene solutions of the polychlorobenzoic acids, in which case many of the salts were recovered in high yield by removing the xylene from the insoluble salt, whereas in other cases, the salts were appreciably soluble in xylene and were recovered by evaporation.

EXAMPLE 7

*Amide of 2,3,5,6-tetrachlorobenzoic acid.*—A solution of 15 grams of 2,3,5,6-tetrachlorobenzoyl chloride in 55 grams of benzene was added to 150 milliliters of concentrated ammonia at 10 degrees centigrade. This mixture was then stirred for 1.5 hours. At the completion of this time 200 milliliters of benzene was added and the contents heated to reflux. The aqueous layer was separated and the benzene layer was washed with water until chloride free. The benzene layer was dried and then distilled leaving a white solid. The 2,3,5,6-tetrachlorobenzamide was analyzed for total chlorine. (Theory is 54.9 percent; found 53.6 percent.)

EXAMPLE 8

*Dimethyl amide of 2,3,5,6-tetrachlorobenzoic acid.*—A solution of 15 grams of 2,3,5,6-tetrachlorobenzoyl chloride in 55 grams of benzene was added to 400 milliliters of dimethylamine (25 percent) at 10 degrees centigrade. This mixture was then stirred for 1.5 hours. At the completion of this time 200 milliliters of benzene was added and the contents heated to reflux. The aqueous layer was separated and the benzene layer was washed with water until chloride free. The benzene layer was dried and then distilled leaving a white solid. The N,N-dimethyl 2,3,5,6-tetrachlorobenzamide was analyzed for total chlorine. (Theory 49.5 percent; found 49.6 percent.) This material had a melting point of 168.8 through 171.6 degrees centigrade.

EXAMPLE 9

*Sodium salts of 2,3,5,6-tetrachlorobenzoic acid.*—A 25 percent solution of NaOH was added to a mixture of 50 grams of water and 25 grams of 2,3,5,6-tetrachlorobenzoic acid, at 75 degrees centigrade, until the mixture became basic. This mixture was then diluted to 170 grams with water, heated to 95 degrees centigrade and filtered. The filtrate was cooled to 10 degrees centigrade and the crystalline salt was filtered and washed once with cold water. This white sodium salt was analyzed for total chlorine. (Theory 50.3 percent; found 49.8 percent.)

EXAMPLE 10

*Ammonium salt of 2,3,5,6-tetrachlorobenzoic acid.*—Concentrated ammonia was added to a mixture of 60 grams of water and 26 grams of 2,3,5,6-tetrachlorobenzoic acid, at 70 degrees centigrade, until the mixture became basic. This mixture was then heated to 75 degrees centigrade and filtered. The filtrate was cooled to 10 degrees centigrade and the crystalline salt was filtered. This white ammonium salt was analyzed for total chlorine. (Theory 51.2 percent; found 49.6 percent.)

EXAMPLE 11

*Dimethylammonium salt of 2,3,5,6-tetrachlorobenzoic acid.*—A 25 percent solution of dimethylamine was added to a mixture of 16 grams of water and 26 grams of 2,3,5,6-tetrachlorobenzoic acid, at 75 degrees centigrade, until the mixture became basic. This mixture was heated to 95 degrees centigrade and filtered. The filtrate was cooled to 10 degrees centigrade and the crystalline salt was filtered. This white dimethylamine salt was analyzed for total chlorine. (Theory 46.6 percent; found 45.9 percent.)

EXAMPLE 12

*Methyl ester of 2,3,5,6-tetrachlorobenzoic acid.*—A mixture of 30 grams of 2,3,5,6-tetrachlorobenzoyl chloride was made with 500 milliliters of methanol and this was refluxed for 18 hours. After this period, the methanol was evaporated until about 50 milliliters remained, then the resultant charge was poured into water. This was then extracted with benzene and the benzene layer extracted with aqueous sodium carbonate. The benzene layer was separated off, filtered and evaporated, leaving a white product which analyzed as methyl 2,3,5,6-tetrachlorobenzoate after being recrystallized from hexane. (Total chlorine—theory 51.8 percent; found 51.6 percent.)

EXAMPLE 13

*Butyl ester of 2,3,5,6-tetrachlorobenzoic acid.*—A mixture of 14 grams of 2,3,5,6-tetrachlorobenzoyl chloride was made with 200 milliliters of n-butanol containing 7 grams of triethylamine. This was heated to reflux for 3 hours, after which the charge was then distilled in order to remove the unreacted n-butanol. Xylene was then added to azeotropically distill any remaining butanol. The contents were then distilled to dryness. The material remaining in the flask was dissolved in benzene and then was washed with water and aqueous $Na_2CO_3$. The benzene layer was filtered and evaporated leaving a white product which analyzed as butyl 2,3,5,6-tetrachlorobenzoate after being crystallized from hexane. (Total chlorine—theory 44.9 percent; found 44.9 percent.)

The following examples illustrate the herbicidal utility of the products of this invention. Although we have found these products to possess exceptional utility as herbicides, we do not intend to be limited thereto as they possess many other uses especially as chemical intermediates and in making pharmaceuticals.

EXAMPLE 14

Field plots 5 feet by 40 feet in length were planted with various crops, and immediately thereafter the soil surface was sprayed with emulsifiable oil formulations of polychlorobenzoic acid derived from a polychlorobenzoyl chloride of specific gravity 1.631 at 25 degrees centigrade. Ten weeks after application, the effects on weed growth and on crop plants was determined at various rates of application and compared with the results from untreated control plots. At rates of application corresponding to 0.7 pound per acre of polychlorobenzoic acid, there was obtained 100 percent control (no emergence) of such important weed pests as lambsquarters, pigweed, mustard, parsnip, ragweed, and purslane. Most of these weeds were inhibited at rates as low as 0.2 pound per acre of polychlorobenzoic acids. Crop plants injured at the rate of 0.7 pound per acre of polychlorobenzoic acid included snapbeans, flax, ladino clover, peas, and alfalfa. Crop plants showing no evidence of injury included corn, wheat, oats, and cotton. At rates of application of polychlorobenzoic acid corresponding to 3.0 pounds per acre, only perennial ryegrass and corn appeared able to survive with little or no injury. Other crops and weeds were seriously injured or killed, and include yellow rocket, lambsquarters, pigweed, mustard, vetch, parsnip, thistle, purslane, ragweed goldenrod, wild carrot quackgrass barnyard grass, millet, foxtails, crabgrass, snapbeans, wheat, oats, flax, ladino clover, peas, alfalfa, and cotton.

The diisopropylammonium salt of the same polychlorobenzoic acid gave results almost identical to that of the free acid. The sodium salt at a rate of 1.0 pound per acre, gave almost complete control of yellow rocket, lambsquarters, pigweed, mustard, vetch, parsnip, purslane, ragweed, millet, snapbeans, flax, ladino clover, and alfalfa, with little or no injury to ryegrass, corn, wheat, oats, peas, and cotton.

EXAMPLE 15

Emulsifiable oil formulations of polychlorobenzoic acid, similar to that used in Example 14 were applied at rates of 1 pound per acre of polychlorobenzoic acid to snapbeans, cucumbers, carrots, broccoli, and spinach plants in field plot experiments. Severe epinastic effects were observed within 15 hours after application, and all plants died subsequently. A similar experiment was performed in which field lambsquarters and ragweed plants were sprayed at rates of 1 and 4 pounds per acre. At a rate of 1 pound per acre, all new growth stopped, galls formed at terminal and lateral growth areas, and the stems became stiff and twisted. At rates of 4 pounds per acre, these weeds were destroyed within a day or two.

EXAMPLE 16

Field plots were sprayed with formulations of polychlorobenzoic acid, similar to that used in Example 14, at rates of 4 and 8 pounds per acre. At periodic intervals, the plots were seeded with lambsquarters, pigweed, purslane, chickweed, barnyard grass, green foxtail, giant foxtail, and crabgrass. As shown in Table I, substantially 100 percent weed control, both seeded and volunteer, was maintained over a period of at least 13 weeks when rates of 8 pounds per acre were employed.

TABLE I.—RESIDUAL WEED CONTROL

| Polychlorobenzoic Acid, lbs. per acre | Duration of Weed Control, weeks | |
|---|---|---|
| | Narrow Leaf | Broad Leaf |
| 4 | 6 | greater than 13. |
| 8 | greater than 13 | greater than 13. |

EXAMPLE 17

One drop of solutions containing 1, 10 and 100 parts per million of each of the polychlorobenzoic acids derived from polychlorobenzoyl chlorides of specific gravity (25 degrees centigrade) 1.602, 1.631, 1.658, and 1.705 was placed on one of the primary leaves of young bean plants. At concentrations of 10 to 100 parts per million, terminal buds refused to open and considerable formative effects were noted. At concentrations of 1 part per million, abnormal trifoliate shoots developed along with auxiliary, abnormal growths.

EXAMPLE 18

Relative greenhouse evaluations were performed using polychlorobenzoic acids derived from polychlorobenzoyl chlorides of specific gravity 1.602, 1.631, 1.658 and 1.705. These acids are referred to as X–1, X–2, X–3 and X–4 for simplicity. The following tests were conducted by planting 4 ml. giant foxtail seeds, 4 ml. green foxtail seeds, 4 ml. perennial ryegrass seed, 4 ml. annual ryegrass seed, and 2 ml. millet, each in 1-inch by 7-inch strips in each of 32 flats having the dimensions 14 inches by 20 inches by 4 inches. Each flat was also planted with 16 cotton seeds. The flats were watered to capacity by sub-irrigation and then duplicate spraying was performed with each chemical at each of 4 concentrations. The results shown in Table II were obtained two weeks after planting, as compared with untreated controls.

Rating system:
- 10 _____ Dead or very serious injury.
- 7–9 _____ Serious injury.
- 4–6 _____ Moderate injury.
- 1–3 _____ Slight injury.
- 0 _____ No injury controls.

TABLE II.—RELATIVE HERBICIDAL ACTIVITIES OF POLYCHLOROBENZOIC ACIDS—SUB-IRRIGATION

| Lbs./Acre | Chemical | Giant Foxtail | Green Foxtail | Perennial Ryegrass | Annual Ryegrass | Millet | Cotton |
|---|---|---|---|---|---|---|---|
| 0.25 | X–1 | 6 | 3 | 0 | 2 | 10 | 0–1 |
| 0.25 | X–2 | 9 | 5 | 2 | 2 | 10 | 0–1 |
| 0.25 | X–3 | 7 | 5 | 8 | 6 | 10 | 0–1 |
| 0.25 | X–4 | 9 | 5 | 8 | 8 | 10 | 0–1 |
| 0.75 | X–1 | 10 | 10 | 9 | 9 | 10 | 10 |
| 0.75 | X–2 | 10 | 10 | 9 | 8 | 5 | 9 |
| 0.75 | X–3 | 10 | 10 | 10 | 8 | 9 | 5 |
| 0.75 | X–4 | 10 | 9 | 9 | 8 | 9 | 1 |
| 1.5 | X–1 | 10 | 10 | 10 | 10 | 10 | 6 |
| 1.5 | X–2 | 10 | 10 | 10 | 9 | 10 | 10 |
| 1.5 | X–3 | 10 | 10 | 10 | 10 | 10 | 5 |
| 1.5 | X–4 | 10 | 10 | 10 | 10 | 10 | 6 |
| 3.0 | X–1 | 10 | 10 | 10 | 7 | 10 | 10 |
| 3.0 | X–2 | 10 | 10 | 10 | 10 | 10 | 9 |
| 3.0 | X–3 | 10 | 10 | 10 | 10 | 10 | 10 |
| 3.0 | X–4 | 10 | 10 | 10 | 10 | 10 | 4 |

The results show extremely high herbicidal activity in the polychlorobenzoic acids derived from polychlorobenzoyl chlorides of specific gravities 1.602 through 1.705.

EXAMPLE 19

Relative greenhouse evaluations were conducted similar to that described in Example 18 using X–4 in comparison with 2,3,4,5-tetrachlorobenzoic acid, trichlorobenzoic acids and dichlorobenzoic acids (70 percent 2,5-dichlorobenzoic acid, 23 percent 2,3-dichlorobenzoic acid, and 7 percent 3,4-dichlorobenzoic acid). Using a rating system as was used in the preceding example, and watering overhead, the results are given in Table III.

TABLE III.—RELATIVE HERBICIDAL EVALUATION OF X–4 IN COMPARISON WITH TRICHLORO- AND DICHLOROBENZOIC ACIDS

| Lbs./Acre | Chemical | Green Foxtail | Giant Foxtail | Corn | Cotton | Beans |
|---|---|---|---|---|---|---|
| 0.25 | X–4 | 6 | 6 | 0 | 0 | 3 |
| 0.25 | 2,3,4,5-Tetrachloro | 0 | 0 | 0 | 0 | 0 |
| 0.25 | Trichloro | 1 | 1 | 3 | 1 | 8 |
| 0.25 | Dichloro | 0 | 0 | 0 | 0 | 0 |
| 0.75 | X–4 | 8 | 8 | 0 | 1 | 5 |
| 0.75 | 2,3,4,5-Tetrachloro | 0 | 1 | | 0 | 2 |
| 0.75 | Trichloro | 5 | 3 | 2 | 5 | 9 |
| 0.75 | Dichloro | 0 | 0 | 0 | 0 | 0 |
| 1.5 | X–4 | 10 | 10 | 0 | 1 | 10 |
| 1.5 | Trichloro | 6 | 6 | 5 | 8 | 10 |
| 1.5 | Dichloro | 0 | 0 | 0 | 0 | 0 |
| 2.0 | 2,3,4,5-Tetrachloro | 0 | 2 | | 0 | 2 |
| 3.0 | X–4 | 8 | 10 | 1 | 0 | 5 |
| 3.0 | Trichloro | 8 | 9 | 10 | 9 | 10 |
| 3.0 | Dichloro | | | | | 0 |
| 6.0 | 2,3,4,5-Tetrachloro | 1 | 6 | | 0 | 5 |

The results show very high herbicidal activity in X–4. The trichlorobenzoic acid appears good but has a marked difference in type of selectivity. On the other hand, the dichlorobenzoic acids and 2,3,4,5-tetrachlorobenzoic acid are shown to possess no significant commercial herbicidal activity.

EXAMPLE 20

Relative greenhouse evaluations, as described in Example 18, were conducted using pure 2,3,5,6-tetrachlorobenzoic acid. The results are given in Table IV, using the previously described rating system.

TABLE IV.—HERBICIDAL ACTIVITY OF PURE 2,3,5,6-TETRACHLOROBENZOIC ACID

| Lbs./Acre | Perennial Ryegrass | Annual Ryegrass | Giant Foxtail | Green Foxtail | Cotton | Beans |
|---|---|---|---|---|---|---|
| 0.04 | 2 | 5 | 4 | 6 | 0 | 9 |
| 0.10 | 5 | 5 | 8 | 6 | 0 | 10 |
| 0.25 | 5 | 8 | 10 | 10 | 2 | 10 |
| 0.50 | 7 | 8 | 10 | 10 | 3 | 10 |
| 0.75 | 7 | 9 | 10 | 10 | 3 | 10 |

The preceding data are given by way of illustrating the invention, and we do not imply any limitations except as stated in the following claim.

We claim:

The amides of 2,3,5,6-tetrachlorobenzoic acid selected from the group consisting of N-alkyl, N,N-dialkyl, N-aryl, N-alkylaryl, N-hydroxy alkyl, N,N-bis(hydroxyalkyl), N-cycloalkyl and 2,3,5,6-tetrachlorobenzamide.

References Cited in the file of this patent

UNITED STATES PATENTS

| | | | |
|---|---|---|---|
| 1,878,463 | Britton | Sept. | 20, 1932 |
| 1,935,648 | Mores | Nov. | 21, 1933 |
| 1,211,467 | Kimball | Aug. | 13, 1940 |
| 2,394,916 | Jones | Feb. | 12, 1946 |
| 2,565,461 | Bliss et al. | Aug. | 28, 1951 |
| 2,607,802 | Britton et al. | Aug. | 19, 1952 |
| 2,695,840 | Leppla | Nov. | 30, 1954 |
| 2,726,947 | Baumgartner | Dec. | 13, 1955 |

OTHER REFERENCES

Thompson et al.: article in "Botanical Gazette," vol. 107, 1946, pages 475 to 507 inclusive (page 498 applied).

Zimmerman et al.: article in "Contributions from Boyce Thompson Institute," vol. 16, 1951, pages 209 to 213 inclusive.

Thompson Institute," 1952, page 423.

Zimmerman et al.: article in "Contributions from Boyce Hamilton et al.: article in "Proc. N.E. Weed Control Conference," January 2 to 4, 1952, pages 65 to 73 inclusive.

Wagner et al.: "Synthetic Organic Chemistry," 1953, page 418.

Grundy: article in "Chemistry and Industry," August 28, 1954, pages 1071 and 1072.